United States Patent
Dunn

(10) Patent No.: US 12,140,482 B2
(45) Date of Patent: Nov. 12, 2024

(54) HEAT-VISUALIZING RADIO FREQUENCY (RF) OR OTHER ELECTRO-MAGNETIC ABSORBER

(71) Applicant: Raytheon Company, Waltham, MA (US)

(72) Inventor: Zachary T. Dunn, Wylie, TX (US)

(73) Assignee: Raytheon Company, Tewksbury, MA (US)

( * ) Notice: Subject to any disclaimer, the term of this patent is extended or adjusted under 35 U.S.C. 154(b) by 829 days.

(21) Appl. No.: 17/157,943

(22) Filed: Jan. 25, 2021

(65) Prior Publication Data
US 2021/0325262 A1    Oct. 21, 2021

Related U.S. Application Data

(60) Provisional application No. 63/013,214, filed on Apr. 21, 2020.

(51) Int. Cl.
*G01K 11/16* (2021.01)
*G01D 7/00* (2006.01)
*G01K 11/12* (2021.01)

(52) U.S. Cl.
CPC .............. *G01K 11/16* (2013.01); *G01D 7/005* (2013.01); *G01K 11/12* (2013.01)

(58) Field of Classification Search
None
See application file for complete search history.

(56) References Cited

U.S. PATENT DOCUMENTS

| 4,455,487 A | 6/1984 | Wendt | |
| 4,814,568 A * | 3/1989 | Keefer | B65D 81/3453 426/243 |
| 5,480,482 A | 1/1996 | Novinson | |
| 5,519,195 A * | 5/1996 | Keefer | B65D 81/3453 426/243 |
| 5,949,582 A | 9/1999 | Coombs | |

FOREIGN PATENT DOCUMENTS

GB    2312954 A  *  11/1997  ........... G01K 11/165

OTHER PUBLICATIONS

"C-RAM AR, Retculated Foam Broadband Radar Absorber," Technical Bulletin 320-3, Cuming Microwave, Nov. 2011, 2 pages.
"Convoluted Foam Absorber," MF32-0002-00, Mast Technologies, Jan. 2011, 1 page.
"RF Absorbing Materials, Ferrite Tiles," Compliance Engineering, 2020, 3 pages.

* cited by examiner

*Primary Examiner* — Ramsey Zacharia

(57) ABSTRACT

An apparatus includes an absorbing material configured to absorb electromagnetic energy. The apparatus also includes a thermochromic material in or on the absorbing material, where the thermochromic material is configured to change one or more visible characteristics based on the absorbing material being heated above a specified temperature threshold. The absorbing material may be configured to absorb radio frequency signals or microwave signals. The one or more visible characteristics may include at least one of: color and opacity.

20 Claims, 5 Drawing Sheets

HEAT-VISUALIZING RADIO FREQUENCY (RF) OR OTHER ELECTRO-MAGNETIC ABSORBER

CROSS-REFERENCE TO RELATED APPLICATION AND PRIORITY CLAIM

This application claims priority under 35 U.S.C. § 119(e) to U.S. Provisional Patent Application No. 63/013,214 filed on Apr. 21, 2020, which is hereby incorporated by reference in its entirety.

TECHNICAL FIELD

This disclosure relates generally to radio frequency (RF) testing. More specifically, this disclosure relates to a heat-visualizing RF or other electro-magnetic absorber.

BACKGROUND

Testing and troubleshooting of high-power radio frequency (RF) systems have many variables, and an RF system's radiating behavior rarely matches what is expected upon initial activation. For example, high-power RF antenna systems or other systems are routinely tested within test ranges, which represent enclosed areas often surrounded by material that absorbs RF signals (typically referred to as RF absorber material). Prior to testing, it is typically unknown how exactly an RF system being tested will radiate RF signals during operation. A detrimental, though not uncommon, outcome of initial testing of a high-power RF system involves overheating and possible ignition of the RF absorber material within a test range.

SUMMARY

This disclosure relates to a heat-visualizing radio frequency (RF) or other electro-magnetic absorber.

In a first embodiment, an apparatus includes an absorbing material configured to absorb electromagnetic energy. The apparatus also includes a thermochromic material in or on the absorbing material, where the thermochromic material is configured to change one or more visible characteristics based on the absorbing material being heated above a specified temperature threshold.

In a second embodiment, a system includes a test range configured to receive radiation emitted by a transmitter. The test range includes an absorbing material configured to absorb the radiation. A thermochromic material in or on the absorbing material is configured to change one or more visible characteristics based on the absorbing material being heated above a specified temperature threshold.

In a third embodiment, a method includes heating an absorbing material using absorbed radiation. The method also includes, in response to the absorbing material being heated above a specified temperature threshold, changing one or more visible characteristics of a thermochromic material in or on the absorbing material.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
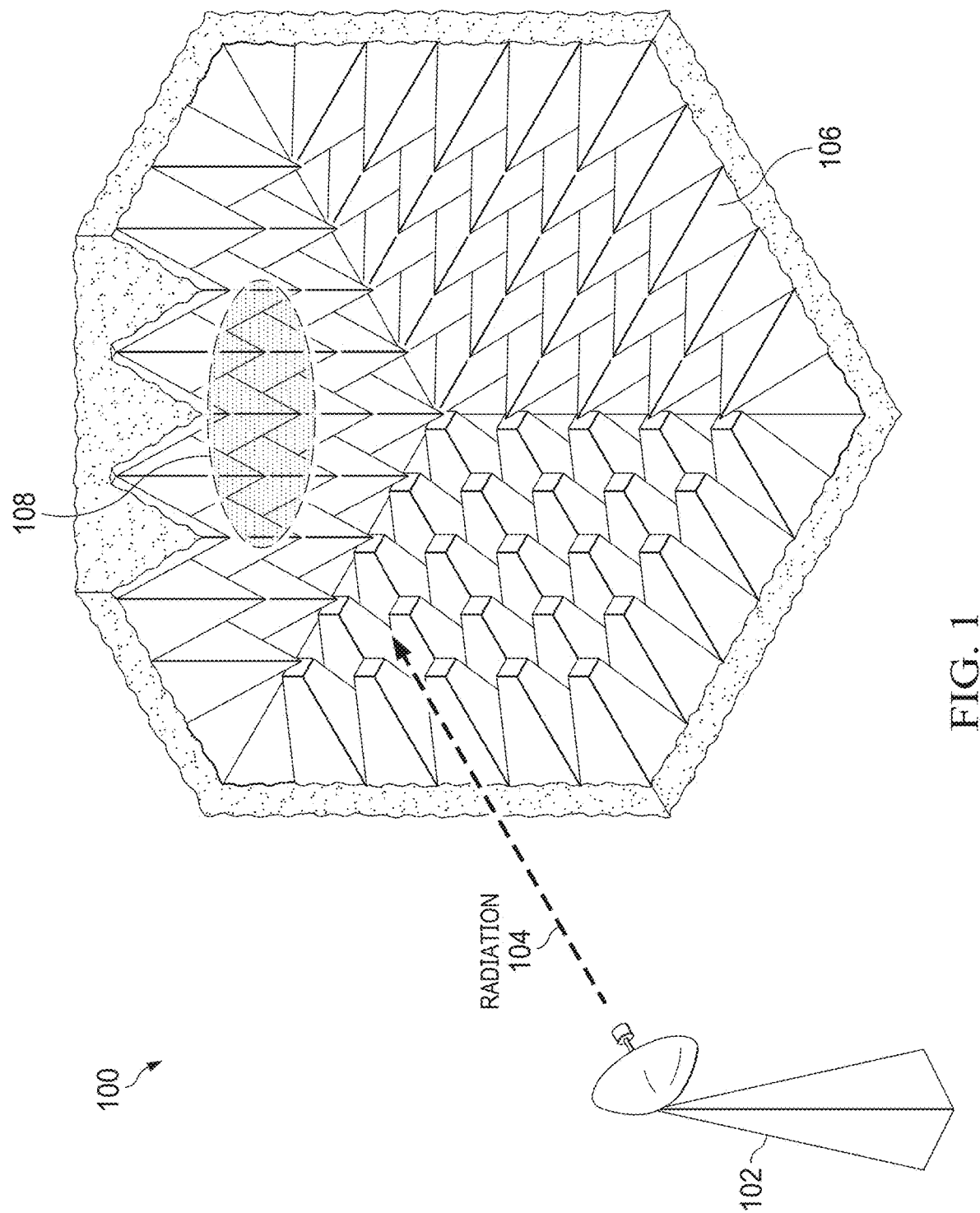
FIG. 1 illustrates an example system for using a heat-visualizing RF absorber material in accordance with this disclosure.

FIGS. 1 through 10, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, testing and troubleshooting of high-power radio frequency (RF) systems have many variables, and an RF system's radiating behavior rarely matches what is expected upon initial activation. For example, high-power RF antenna systems or other systems are routinely tested within test ranges, and it is typically unknown prior to testing how exactly an RF system being tested will radiate RF signals during operation. A detrimental, though not uncommon, outcome of initial testing of a high-power RF system involves overheating and possible ignition of RF absorber material within a test range.

From a safety standpoint, the problem with RF energy is that humans have no natural ability to detect RF energy outside the visible light bands, and smoke generated from burning common RF absorber material is carcinogenic. As a result, the first sign that a high-power RF system may not be behaving as expected is often when the RF absorber material within a test range begins to smoke or burn, at which point a safety hazard is already present. Once the immediate safety concern has passed, additional program delays and costs resulting from range shutdowns and repairs are often incurred, as well.

One common approach for monitoring RF absorber material in scenarios where excessive heat may be a concern involves placing a thermal imaging camera with the RF absorber material in view. However, thermal imaging cameras tend to be very expensive and may require range operators to monitor another piece of equipment during testing. Also, the use of thermal imaging cameras can raise potential security-related issues when a closed area or secure range is involved. As a result, it is common for test ranges to forego the use of thermal monitoring systems. Another common approach for monitoring RF absorber material in scenarios where excessive heat may be a concern involves embedding thermocouples in the RF absorber material. However, the thermocouples tend to be positioned sporadically throughout the RF absorber material, resulting in a very low probability that the location being monitored is at the highest risk of igniting.

This disclosure provides heat-visualizing RF absorbers that are configured to visibly identify when RF absorber material is heated excessively. For example, an RF absorber can include a foam or other RF absorber material that is configured to absorb RF energy, where a thermochromic material is included within or on the RF absorbing material.

The thermochromic material represents a material that can change opacity, color, or other visible characteristic(s) if and when the RF absorbing material is heated excessively, such as when the RF absorbing material surpasses a specified temperature threshold. The temperature at which the thermochromic material changes in opacity, color, or other visible characteristic(s) can be lower than the ignition temperature of the RF absorber material, which allows the visible change to occur before the RF absorber material begins to smoke or burn. This allows personnel to quickly and easily determine whether the RF absorber material is experiencing excessive heating, such as during a test of a high-power RF system whose exact radiating behavior is unknown.

Note that while this disclosure often describes the use of one or more thermochromic materials with one or more RF absorber materials, this disclosure is not limited to the use of absorber materials that absorb RF signals. Materials that absorb other electro-magnetic signals may also include or be used in conjunction with one or more thermochromic materials. For example, one or more microwave absorber materials may include or be used in conjunction with one or more thermochromic materials. As a result, while various embodiments of this disclosure are often described below as involving RF signals or other RF radiation, this disclosure is not limited to any particular spectrum of electro-magnetic signals.

FIG. 1 illustrates an example system 100 for using a heat-visualizing RF absorber material in accordance with this disclosure. As shown in FIG. 1, the system 100 includes an RF transmitter 102, which is being used in conjunction with a test range. The RF transmitter 102 includes any suitable device or system configured to transmit RF radiation 104, such as one or more antennas. In some embodiments, the RF transmitter 102 represents a high-power transmitter that can generate RF radiation 104 at high power levels. During initial testing of the RF transmitter 102 or at other times, the pattern of the RF radiation 104 generated by the RF transmitter 102 may be unknown, at least to within some specified or desired degree of accuracy. Note that the exact RF transmitter 102 and the exact form of the RF radiation 104 can vary as needed or desired. As a result, this disclosure is not limited to any particular form or type of RF transmitter 102, and the RF transmitter 102 is not limited to any particular form or type of RF radiation 104.

The test range includes any suitable environment in which at least one RF transmitter 102 can be tested. The test range may typically include a relatively large area in which the RF transmitter 102 can be placed and activated in order to determine (among other things) how the RF transmitter 102 radiates the RF radiation 104 into space during operation. Note that the overall size of the test range can vary as needed or desired and that the dimensions of the test range can similarly vary as needed or desired.

The test range here includes RF absorber material 106, which is typically positioned around the inner perimeter of the test range. The RF absorber material 106 is generally used to absorb the RF radiation 104 emitted by the RF transmitter 102. This allows the RF transmitter 102 to be tested or otherwise operated within the test range while having little or no impact on external environments. This may be needed or desired for safety reasons, such as to prevent injury to people or damage to equipment outside the test range during operation of the RF transmitter 102. This may also be needed or desired for security reasons, such as to prevent outside parties from discerning one or more design or operating parameters of the RF transmitter 102 being tested.

The RF absorber material 106 includes any suitable material(s) that can absorb RF energy. For example, the RF absorber material 106 often includes foam, plastic, glass, synthetic fibers (such as NOMEX), or other material(s) that can absorb the RF radiation 104 emitted by the RF transmitter 102. Various types of materials that can absorb RF energy are known in the art, and additional types of materials that can absorb RF energy are sure to be developed in the future. Note that this disclosure is not limited to use with any particular type of RF absorber material 106 and that any suitable RF absorber material 106 may be used in the test range here.

In some embodiments, the RF absorber material 106 has a non-uniform surface, such as when the surface of the RF absorber material 106 forms or includes rounded, truncated, or pointed cones, pyramids, waves, triangular prisms, or other shapes. However, this is not required, and the RF absorber material 106 may have an overall planar or flat shape (although such an RF absorber material 106 may be installed in such a way that the surfaces of the RF absorber material 106 do not remain planar). Also, in some embodiments, the RF absorber material 106 may have a regular pattern, such as a honeycomb pattern or other regular arrangement of projections or other shapes, formed from one or more suitable materials.

As described above, the pattern of radiation 104 emitted by the RF transmitter 102 may be unpredictable or otherwise deviate from what is expected, such as upon initial activation. Thus, it is possible for a portion of the RF absorber material 106 to overheat and possibly ignite. This may occur, for example, if the pattern of radiation 104 emitted by the RF transmitter 102 is more focused in one or more areas than anticipated. This can cause a portion of the RF absorber material 106 to absorb more RF energy than expected, which can cause that portion of the RF absorber material 106 to overheat or even burn.

In accordance with this disclosure, the RF absorber material 106 is embedded with, is stained with, or otherwise includes thermochromic dye, pigment, or other material. Thermochromic material is a material that changes opacity, color, or other visible characteristic(s) when a particular temperature threshold is surpassed. The RF absorber material 106, along with thermochromic material, will therefore visibly change opacity, color, or other visible characteristic(s) when overheating. For instance, the opacity, color, or other visible characteristic(s) of a portion 108 of the RF absorber material 106 in FIG. 1 may change at an elevated temperature that is still below the ignition temperature of the RF absorber material 106. This allows a range operator or other personnel, such as those with a clear sight of the absorber material 106, to visually identify potential safety issues early, namely by identifying changes in opacity, color, or other visible characteristic(s) of one or more portions 108 of the RF absorber material 106 prior to burning of the RF absorber material 106.

The thermochromic material used in or with the RF absorber material 106 can thereby be used to identify one or more locations at the highest risk of ignition and provide an intuitive early warning to range operators or other personnel. Thus, the thermochromic material in or with the RF absorber material 106 provides an easily recognizable early warning upon excessive heating that does not require additional monitoring equipment. Changes in the opacity, color, or other visible characteristic(s) of the thermochromic material can be used to inherently display or identify focused RF power locations, which provides the added benefit of allowing visual system transmit-mode troubleshooting (such as accidental system activations or unintended system hotspots). These indications can also be provided without security issues, since the RF absorber material 106 and the thermochromic material can be used in closed area or secure ranges. In addition, utilizing the RF absorber material 106 with the thermochromic material may be more cost effective than using a thermal imaging system, depending upon the area of the RF absorber material 106 required in a test range.

Note that the thermochromic material used here is not limited to changing in opacity, color, or other visible characteristic(s) only when the RF absorber material 106 is excessively heated. The visible characteristic(s) of the thermochromic material can also change or revert back to a prior state when the RF absorber material 106 cools below the temperature threshold (or a different temperature threshold). For example, the thermochromic material may change in opacity, color, or other visible characteristic(s) when heated above the temperature threshold and then revert back to its original visible characteristic(s) when cooled below the temperature threshold. As a result, the thermochromic material may experience any number of changes in its visible characteristic(s) as the RF absorber material 106 is used over time.

The RF absorber material 106 can be fabricated in any suitable manner. For example, standard RF absorbing foam, plastic, glass, synthetic fibers, or other RF absorber material can have thermochromic dye, pigment, or other material sprayed or otherwise placed on or in the RF absorber material. Of course, the RF absorber material 106 can be formed using any other suitable techniques. The RF absorber material 106 can also be installed in any suitable manner. For instance, the RF absorber material 106 can be fabricated into panels, and the panels of the RF absorber material 106 can be installed on the floor, roof, walls, or other structures of the test range.

Although FIG. 1 illustrates one example of a system 100 for using a heat-visualizing RF absorber material 106, various changes may be made to FIG. 1. For example, the system 100 may include any suitable RF transmitter 102 that generates any suitable RF radiation 104. Also, the system 100 may include any suitable RF absorber material 106 arranged in any suitable manner within the test range. In addition, the transmitter 102 may represent a different type of transmitter (such as a microwave transmitter), and the absorber material 106 may represent a different type of material (such as a microwave absorber material).

FIGS. 2 through 8 illustrate example designs for heat-visualizing RF absorber materials 106a-106g in accordance with this disclosure. In particular, FIGS. 2 through 8 illustrate examples of the types of surface features that may be used with the RF absorber materials 106a-106g. For ease of explanation, the heat-visualizing RF absorber materials 106a-106g shown in FIGS. 2 through 8 may be described as being used in the system 100 of FIG. 1. However, the heat-visualizing RF absorber materials 106a-106g may be used in any other suitable environment.

Figure 2:
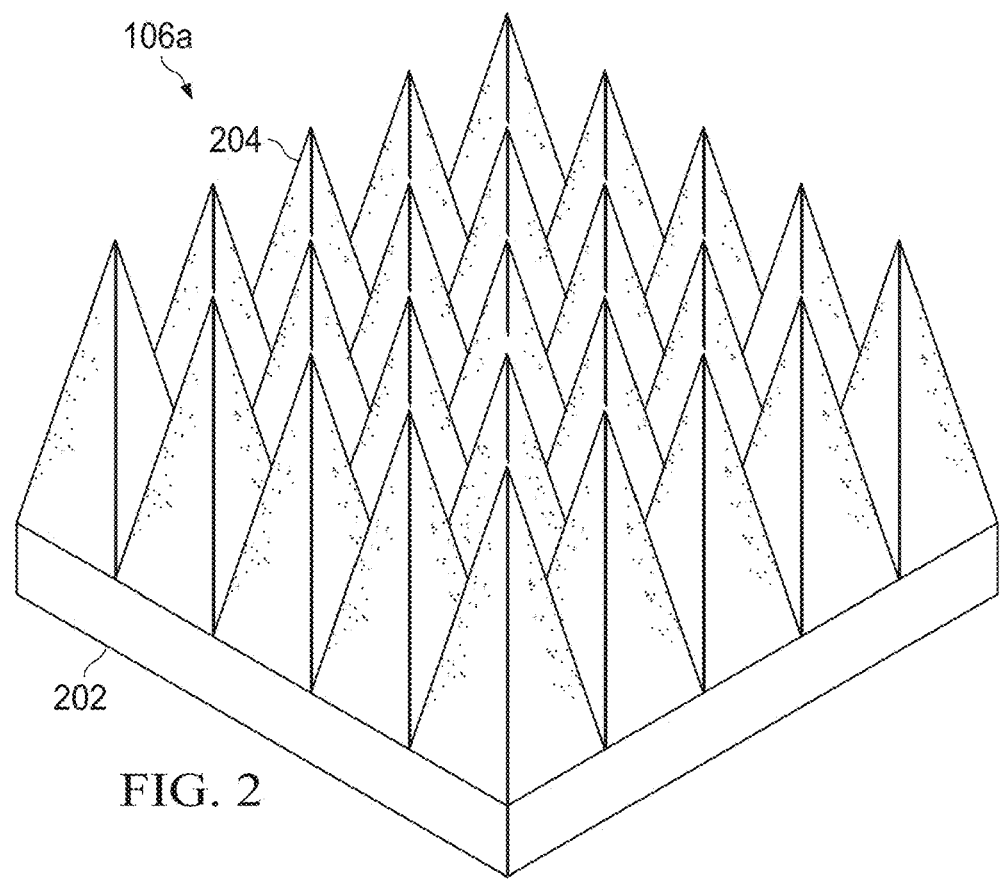
FIGS. 2 through 8 illustrate example designs for heat-visualizing RF absorber materials in accordance with this disclosure.
Figure 3:
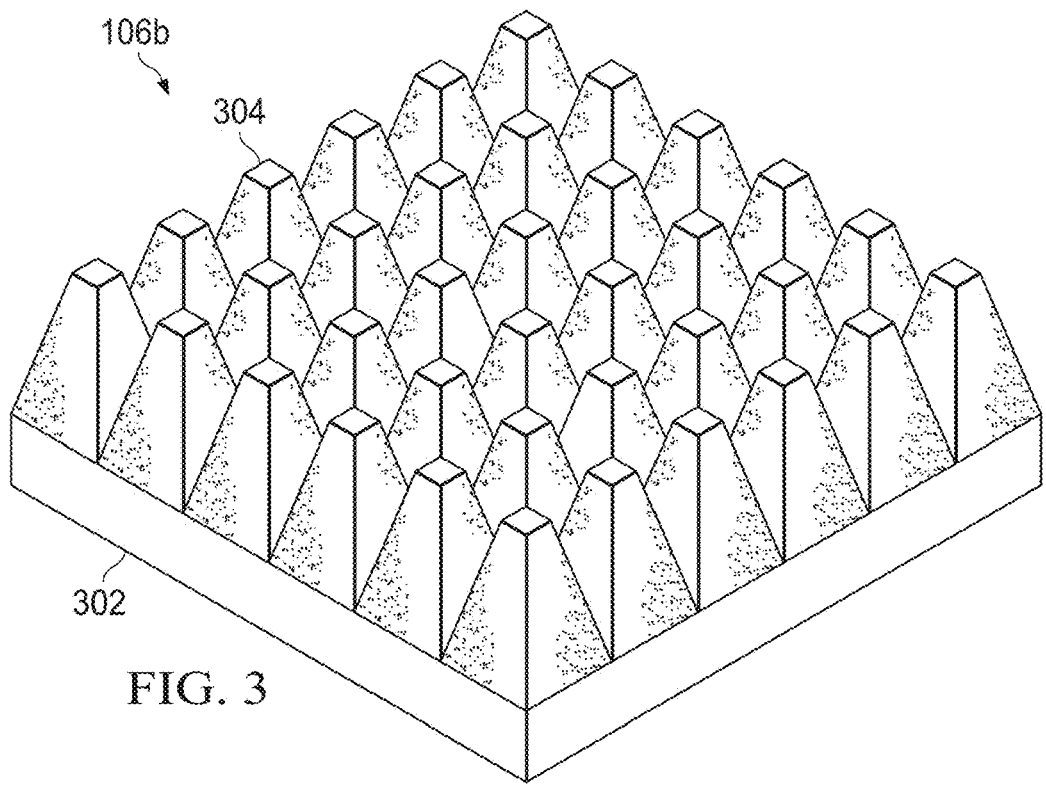

As shown in FIG. 2, an RF absorber material 106a includes a base 202 and projections 204 extending from the base 202. The projections 204 here are in the form of elongated four-sided pyramids, each of which tapers from a largest cross-sectional area where the projection 204 meets the base 202 to a point opposite the base 202. As shown in FIG. 3, an RF absorber material 106b includes a base 302 and projections 304 extending from the base 302. The projections 304 here are in the form of truncated four-sided pyramids, each of which tapers from a largest cross-sectional area where the projection 204 meets the base 202 to a smallest cross-sectional area opposite the base 202. Note that while the projections 304 here are shown as having truncated ends, other transitions may be used here (such as when rounded ends are used for the projections 304).

Figure 4:
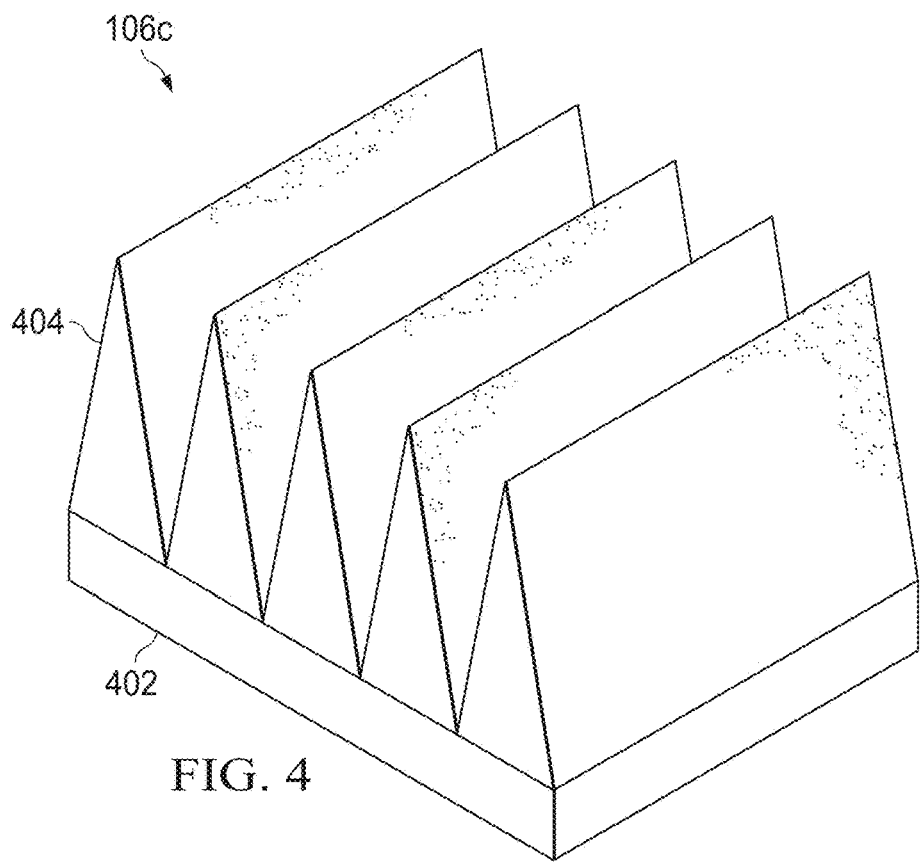
Figure 5:
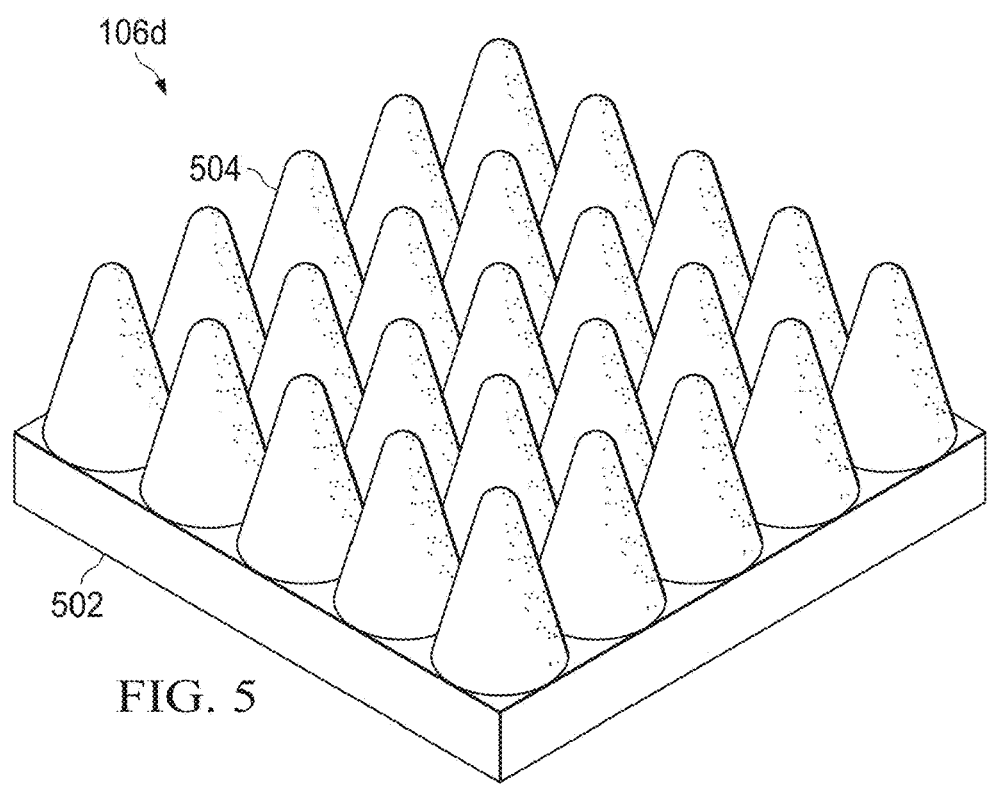

As shown in FIG. 4, an RF absorber material 106c includes a base 402 and projections 404 extending from the base 402. The projections 404 here are in the form of elongated triangular prisms, each of which tapers from a largest cross-sectional area where the projection 404 meets the base 402 to a ridge opposite the base 402. Note that while the ridges here represent generally well-defined edges, the ridges may be replaced with truncated or rounded ridges or ridges of other shapes. As shown in FIG. 5, an RF absorber material 106d includes a base 502 and projections 504 extending from the base 502. The projections 504 here are in the form of rounded cones, each of which tapers from a largest cross-sectional area where the projection 504 meets the base 502 to a rounded end opposite the base 502. Note that while the projections 504 here are shown as having rounded ends, other shapes may be used here (such as when truncated or pointed ends are used for the projections 504).

Figure 6:
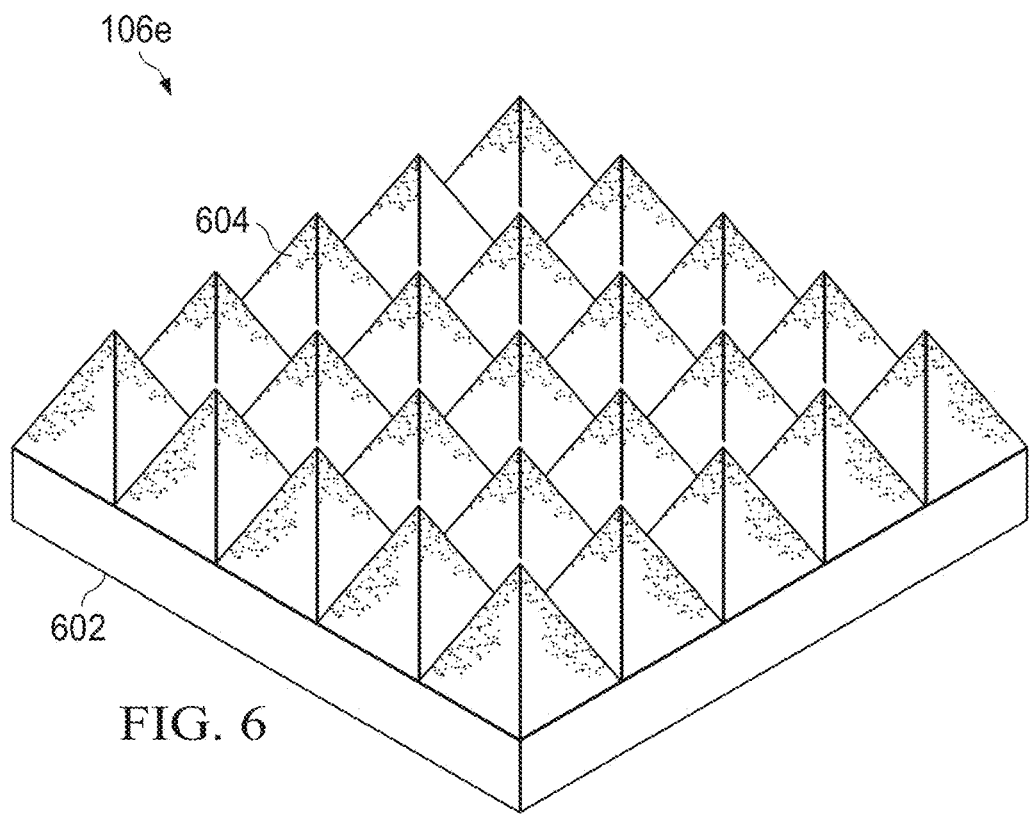
Figure 7:
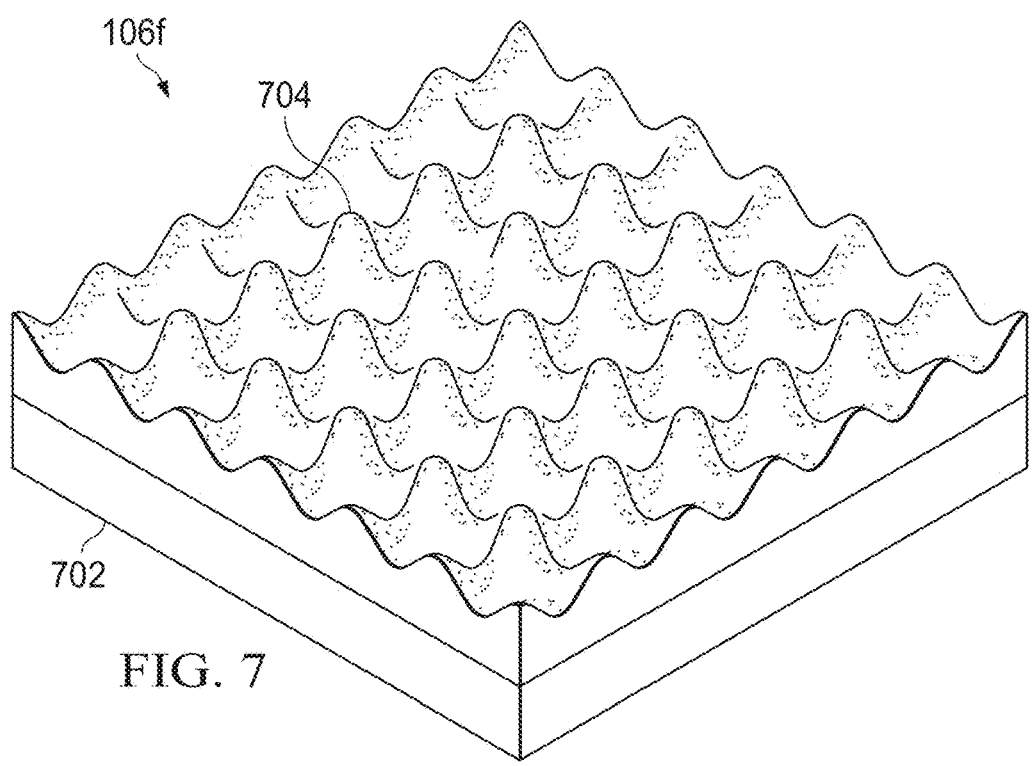

As shown in FIG. 6, an RF absorber material 106e includes a base 602 and projections 604 extending from the base 602. The projections 604 here are in the form of short four-sided pyramids, each of which quickly tapers from a largest cross-sectional area where the projection 604 meets the base 602 to a point opposite the base 602. Note that while the projections 604 here are shown as having pointed ends, other shapes may be used here (such as when truncated or rounded ends are used for the projections 604). As shown in FIG. 7, an RF absorber material 106f includes a base 702 and projections 704 extending from the base 702. The projections 704 here form an "egg crate" style pattern with a two-dimensional wavy surface, where each projection 704 is curved or rounded. Note that while the projections 704 here are shown as having curved or rounded surfaces, other shapes may be used here (such as when truncated or pointed surfaces are used for the projections 704).

Figure 8:
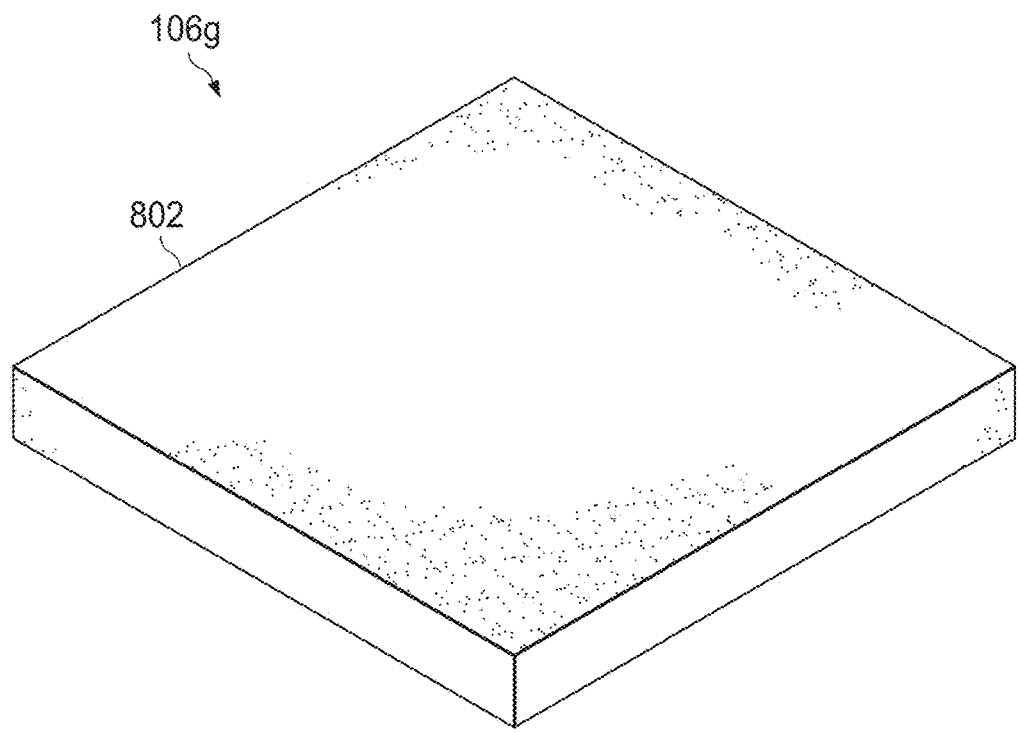

In each of these RF absorber materials 106a-106f, the base 202-702 of the RF absorber material 106a-106f can have any suitable thickness, and the projections 204-704 of the RF absorber material 106a-106f can be integral with or attached to the corresponding base 202-702 in any suitable manner. Also, the numbers of projections, the sizes of the projections, the shapes of the projections, and other characteristics of the projections in each RF absorber material 106a-106f can vary as needed or desired. As a particular example, while rounded, truncated, and pointed cones, pyramids, waves, and triangular prisms have been shown here, any other desired shapes may be used. As another example, the size of each of the projections 204-704 might vary between relatively small values (such as around three inches or 7.62 centimeters) to much larger values (such as around eight feet or 2.4384 meters). In addition, note that the use of projections from a base are not required in an RF absorber material. For example, as shown in FIG. 8, an RF absorber material 106g includes a generally planar or flat structure 802 without any projections. The RF absorber material 106g here can have any suitable thickness, which might range from relatively small values (such as one-sixteenth of an inch or 1.5875 millimeters) to much larger values.

Although FIGS. 2 through 8 illustrate examples of designs for heat-visualizing RF absorber materials 106a-106g, various changes may be made to FIGS. 2 through 8.

For example, the RF absorber material 106 may have any other suitable size, shape, and dimensions. Also, an RF absorber material 106 need not use the same pattern for its surface features (assuming surface features are used) throughout an entire test range or other installation. In addition, the absorber materials 106a-106g may represent a different type of material (such as one or more microwave absorber materials).

Figure 9:
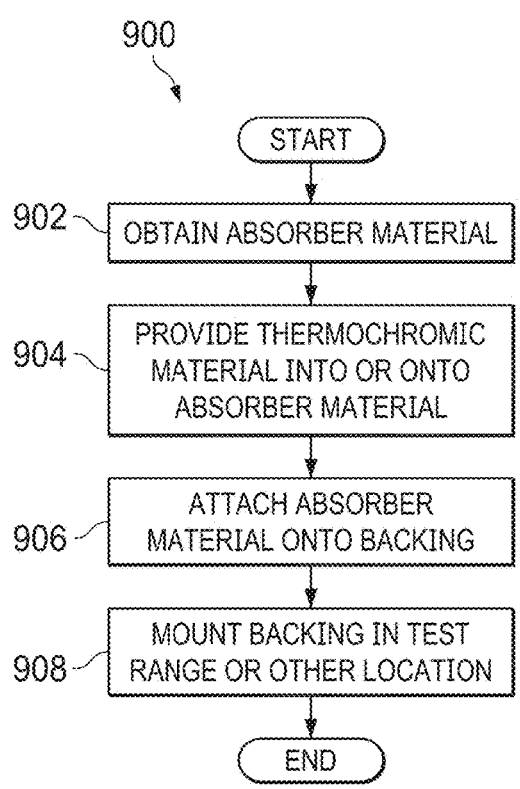
FIG. 9 illustrates an example method for fabricating heat-visualizing RF absorber material in accordance with this disclosure.

FIG. 9 illustrates an example method 900 for fabricating heat-visualizing RF absorber material in accordance with this disclosure. For ease of explanation, the method 900 shown in FIG. 9 may be described as being used to fabricate the RF absorber material 106, which may be used in the system 100 of FIG. 1. However, the method 900 may be used to fabricate any other suitable absorber material, such as the RF absorber materials 106a-106g of FIGS. 2 through 8.

As shown in FIG. 9, an absorber material is obtained at step 902, and thermochromic material is provided into or onto the absorber material at step 904. This may include, for example, forming RF absorber material 106 into a desired form, such as one having desired surface features (or a lack thereof). Note that the RF absorber material 106 may be fabricated here or obtained from another source. This may also include spraying the thermochromic material onto the RF absorber material 106, soaking the RF absorber material 106 in the thermochromic material, or otherwise placing the thermochromic material onto or into the RF absorber material 106.

The absorber material is mounted onto a backing at step 906. This may include, for example, using adhesive or other technique to bond or otherwise attach the RF absorber material 106 to a suitable backing, such as plastic, wood, or other panels. The RF absorber material 106 here may be formed to fit onto each individual panel, such as when cut or otherwise sized to fit onto each individual panel, or the RF absorber material 106 may be placed onto each panel and then trimmed as needed. The RF absorber material 106 here may also be placed onto a larger substrate and then cut along with the larger substrate, such as when placed onto a larger piece of plastic, wood, or other panel and then cut to form individual panels carrying the RF absorber material 106. The backing can be mounted in a test range or other desired location at step 908. This may include, for example, bolting or otherwise securing the panels carrying the RF absorber material 106 to the floor, roof, walls, or other structures of the test range.

Although FIG. 9 illustrates one example of a method 900 for fabricating heat-visualizing RF absorber material, various changes may be made to FIG. 9. For example, while shown as a series of steps, various steps in FIG. 9 can overlap, occur in parallel, occur in a different order, or occur any number of times. As a particular example, the thermochromic material may be incorporated into the absorber material or otherwise provided into or onto the absorber material during fabrication of the absorber material. Also, the absorber material may represent a different type of material (such as one or more microwave absorber materials).

Figure 10:
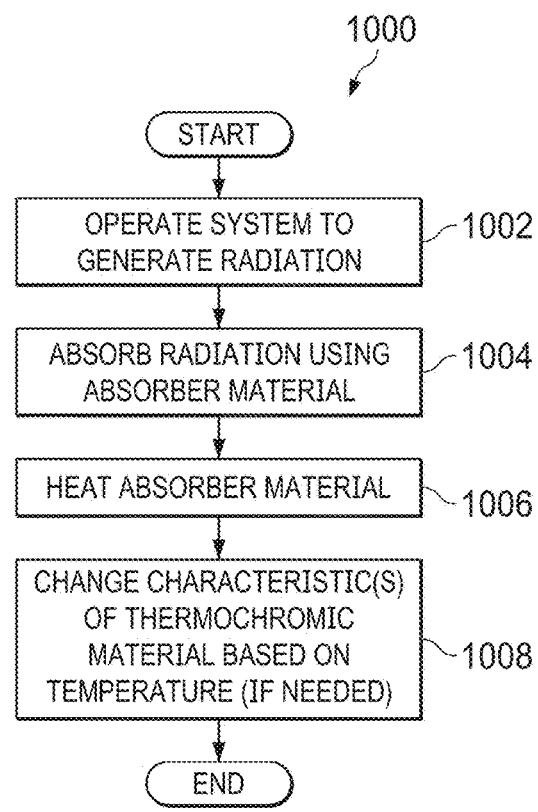
FIG. 10 illustrates an example method for using heat-visualizing RF absorber material in accordance with this disclosure.

FIG. 10 illustrates an example method 1000 for using heat-visualizing RF absorber material in accordance with this disclosure. For ease of explanation, the method 1000 shown in FIG. 10 may be described as involving the use of the RF absorber material 106 in the system 100 of FIG. 1. However, the RF absorber material 106 or other absorber material may be used in any other suitable manner.

As shown in FIG. 10, a system is operated to generate radiation at step 1002, and at least some of the radiation is absorbed using an absorber material at step 1004. This may include, for example, operating an RF transmitter 102 or other system within a test range or other location. This may also include the RF transmitter 102 or other system emitting the RF radiation 104 or other radiation, which may or may not occur generally in line as anticipated. The absorber material is heated as a result of the radiation absorption at step 1006. Depending on how the system is operating and emitting radiation, the absorber material may or may not be excessively heated. However, if needed, one or more characteristics of thermochromic material in or on the absorber material may change based on the temperature increase at step 1008. This may include, for example, the thermochromic material in or on the RF absorber material 106 or other absorber material changing color or opacity.

Although FIG. 10 illustrates one example of a method 1000 for using heat-visualizing RF absorber material, various changes may be made to FIG. 10. For example, while shown as a series of steps, various steps in FIG. 10 can overlap, occur in parallel, occur in a different order, or occur any number of times. Also, the absorber material may represent a different type of material (such as one or more microwave absorber materials).

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An apparatus comprising:
 a panel comprising a backing material and an absorbing material attached to the backing material, the absorbing material configured to absorb electromagnetic energy, the absorbing material comprising a base and a plurality of projections extending from the base, the projections arranged in a pattern that covers all or substantially all of the base, each projection having a pyramidal or conical shape and a size between about three inches and about eight feet; and a thermochromic material applied to surfaces of the projections of the absorbing material, the thermochromic material configured to change one or more visible characteristics based on the absorbing material being heated above a specified temperature threshold;

wherein the panel is configured to be mounted to a wall of a test range.

2. The apparatus of claim 1, wherein the thermochromic material comprises at least one of: a thermochromic dye and a thermochromic pigment.

3. The apparatus of claim 1, wherein the absorbing material comprises foam, plastic, glass, or synthetic fibers.

4. The apparatus of claim 1, wherein the pattern of the projections comprises a grid having multiple rows and columns.

5. The apparatus of claim 1, wherein the absorbing material is configured to absorb radio frequency signals or microwave signals.

6. The apparatus of claim 1, wherein the specified temperature threshold is lower than an ignition temperature of the absorbing material.

7. The apparatus of claim 1, wherein the thermochromic material is configured to revert the one or more visible characteristics based on the absorbing material being cooled below the specified temperature threshold.

8. A system comprising:

a test range configured to receive radiation emitted by a transmitter, the test range comprising multiple walls;

wherein the test range includes multiple panels mounted to the multiples walls, each panel comprising a backing material and an absorbing material attached to the backing material, the absorbing material configured to absorb the radiation, the absorbing material comprising a base and a plurality of projections extending from the base, the projections arranged in a pattern that covers all or substantially all of the base, each projection having a pyramidal or conical shape and a size between about three inches and about eight feet; and wherein a thermochromic material applied to surfaces of the projections of the absorbing material is configured to change one or more visible characteristics based on the absorbing material being heated above a specified temperature threshold.

9. The system of claim 8, wherein the thermochromic material comprises at least one of: a thermochromic dye and a thermochromic pigment.

10. The system of claim 8, wherein the absorbing material comprises foam, plastic, glass, or synthetic fibers.

11. The system of claim 8, wherein the pattern of the projections comprises a grid having multiple rows and columns.

12. The system of claim 8, wherein the absorbing material is configured to absorb radio frequency signals or microwave signals.

13. The system of claim 8, wherein the specified temperature threshold is lower than an ignition temperature of the absorbing material.

14. The system of claim 8, wherein the thermochromic material is configured to revert the one or more visible characteristics based on the absorbing material being cooled below the specified temperature threshold.

15. A method comprising:

heating an absorbing material using absorbed radiation, the absorbing material attached to a panel comprising a backing material, the absorbing material comprising a base and a plurality of projections extending from the base, the projections arranged in a pattern that covers all or substantially all of the base, each projection having a pyramidal or conical shape and a size between about three inches and about eight feet; and in response to the absorbing material being heated above a specified temperature threshold, changing one or more visible characteristics of a thermochromic material applied to surfaces of the projections of the absorbing material;

wherein the panel is mounted to a wall of a test range.

16. The method of claim 15, wherein the thermochromic material comprises at least one of: a thermochromic dye and a thermochromic pigment.

17. The method of claim 15, wherein the absorbing material comprises foam, plastic, glass, or synthetic fibers.

18. The method of claim 15, wherein the pattern of the projections comprises a grid having multiple rows and columns.

19. The method of claim 15, wherein the absorbing material absorbs radio frequency signals or microwave signals.

20. The method of claim 15, wherein the specified temperature threshold is lower than an ignition temperature of the absorbing material.

* * * * *